United States Patent
Marcerou et al.

(10) Patent No.: US 9,031,405 B2
(45) Date of Patent: May 12, 2015

(54) SYSTEM AND METHOD FOR TRANSMITTING OPTICAL SIGNALS

(75) Inventors: Jean-François Marcerou, Nozay (FR); Carine Laval, Nozay (FR); Sébastien Dupont, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 68 days.

(21) Appl. No.: 13/379,421

(22) PCT Filed: Jun. 25, 2010

(86) PCT No.: PCT/EP2010/059076
§ 371 (c)(1),
(2), (4) Date: Jan. 20, 2012

(87) PCT Pub. No.: WO2011/000786
PCT Pub. Date: Jan. 6, 2011

(65) Prior Publication Data
US 2012/0114335 A1    May 10, 2012

(30) Foreign Application Priority Data

Jun. 30, 2009 (EP) .................................. 09290515

(51) Int. Cl.
*H04J 14/02* (2006.01)
*H04K 1/04* (2006.01)
*H04K 1/06* (2006.01)

(52) U.S. Cl.
CPC .............. *H04J 14/0227* (2013.01); *H04K 1/04* (2013.01); *H04K 1/06* (2013.01)

(58) Field of Classification Search
USPC .............. 398/53, 102, 141, 161, 173, 180, 39
See application file for complete search history.

(56) References Cited

U.S. PATENT DOCUMENTS

| | | | |
|---|---|---|---|
| 4,866,699 A * | 9/1989 | Brackett et al. ................... 398/78 |
| 5,453,865 A * | 9/1995 | Faulkner et al. .................... 398/9 |
| 5,506,710 A * | 4/1996 | Hamel ............................... 398/83 |
| 5,907,421 A * | 5/1999 | Warren et al. .................. 398/188 |
| 5,911,016 A | 6/1999 | Naito |
| 6,075,628 A * | 6/2000 | Fisher et al. ...................... 398/21 |
| 6,538,786 B1 * | 3/2003 | Naito ............................. 398/152 |

(Continued)

FOREIGN PATENT DOCUMENTS

CN    101242516    8/2008

OTHER PUBLICATIONS

Cornejo; J.A. et al; WDM—Compatible Channel Scrambling for Secure High-Data-Rate Optical Transmissions; Journal of Lightwave Technology, vol. 25, No. 8; Aug. 2007; pp. 2081-2089; 2007 IEEE.

*Primary Examiner* — Agustin Bello
(74) *Attorney, Agent, or Firm* — Patti & Malrone Law Group, LLC

(57) ABSTRACT

A method of transmitting optical signals in a submarine optical network and an optical unit for performing the method, the optical unit is configured for receiving an optical signal comprising a plurality of wavelengths where at least some of the wavelengths comprise traffic data. The optical unit includes a processor unit which is configured for scrambling the shape of at least one wavelength comprising traffic data of the optical signal so as to make said traffic data of said at least one wavelength undetectable for a receiver station.

10 Claims, 1 Drawing Sheet

(56) References Cited

U.S. PATENT DOCUMENTS

| | | | |
|---|---|---|---|
| 7,136,593 B1 * | 11/2006 | Yano | 398/158 |
| 7,206,517 B1 * | 4/2007 | Yu et al. | 398/152 |
| 7,343,101 B1 * | 3/2008 | Frankel et al. | 398/158 |
| 7,447,312 B2 * | 11/2008 | Javidi et al. | 380/54 |
| 7,583,895 B2 * | 9/2009 | Nakamura et al. | 398/65 |
| 7,702,240 B2 * | 4/2010 | Minato | 398/74 |
| 7,720,226 B2 * | 5/2010 | Turpin | 380/256 |
| 7,756,420 B2 * | 7/2010 | Osterberg et al. | 398/142 |
| 7,853,146 B2 * | 12/2010 | Takakuwa et al. | 398/53 |
| 7,903,973 B1 * | 3/2011 | Uhlhorn et al. | 398/77 |
| 7,965,944 B2 * | 6/2011 | Li et al. | 398/143 |
| 8,195,046 B2 * | 6/2012 | Xia et al. | 398/29 |
| 8,290,371 B2 * | 10/2012 | Etemad et al. | 398/79 |
| 8,355,507 B1 * | 1/2013 | Beffa et al. | 380/256 |
| 8,417,123 B2 * | 4/2013 | Osterberg et al. | 398/142 |
| 8,428,259 B2 * | 4/2013 | Waters | 380/256 |
| 8,488,967 B2 * | 7/2013 | Etemad et al. | 398/79 |
| 2003/0058499 A1 * | 3/2003 | Reingand et al. | 359/135 |
| 2004/0081471 A1 * | 4/2004 | Lee | 398/193 |
| 2004/0264695 A1 * | 12/2004 | Turpin | 380/200 |
| 2005/0041984 A1 * | 2/2005 | Chandler | 398/189 |
| 2007/0036549 A1 * | 2/2007 | Takakuwa et al. | 398/102 |
| 2007/0166038 A1 * | 7/2007 | Yano | 398/79 |
| 2007/0248361 A1 * | 10/2007 | Nakamura et al. | 398/152 |
| 2008/0112706 A1 * | 5/2008 | Kim et al. | 398/91 |
| 2009/0162059 A1 * | 6/2009 | Nakamoto | 398/48 |
| 2010/0074444 A1 * | 3/2010 | Etemad | 380/256 |
| 2010/0183309 A1 * | 7/2010 | Etemad et al. | 398/79 |
| 2012/0114335 A1 * | 5/2012 | Marcerou et al. | 398/58 |

* cited by examiner

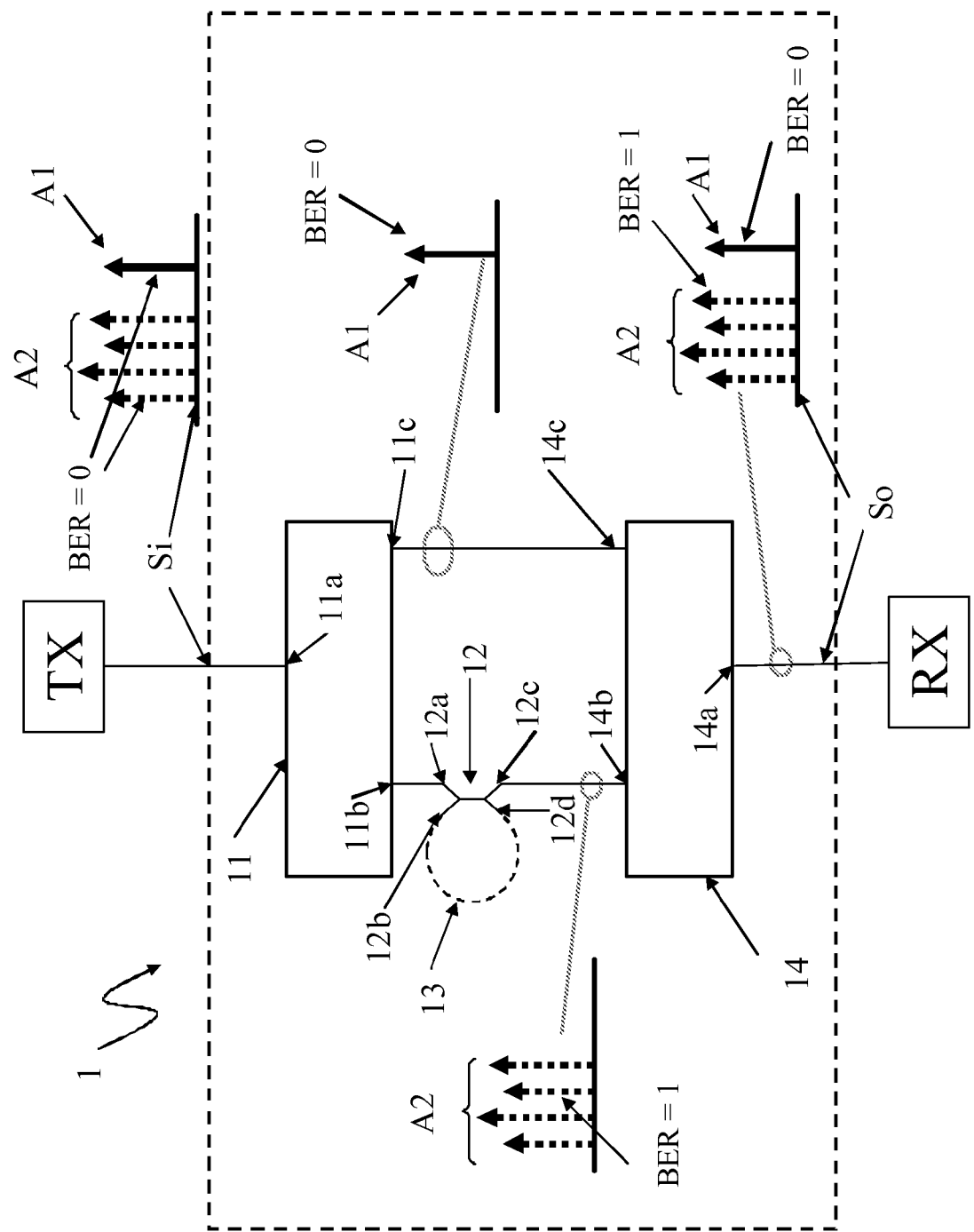

SYSTEM AND METHOD FOR TRANSMITTING OPTICAL SIGNALS

The present invention relates to optical submarine communications networks.

BACKGROUND ART

Optical submarine cables are used for transmitting optical signals. Such cables typically have a plurality of optical fiber pairs which are used for transmission of optical signals. In certain applications it may be required that different fiber pairs are allocated to different customers, such that the entire capacity in one fiber pair is allocated to one particular customer. In such a case, there is no possible access by other customers that are allocated other fiber pairs, to the fiber pair of that particular customer. However, in certain cases, the capacity inside one fiber pair may be shared between various customers. Typically, the fiber may carry various wavelengths, and each wavelength is intended for use of a separate customer. In such cases a wavelength add-drop branching unit is inserted in the system and thereby some wavelengths are routed towards a branch station. In submarine networks, optical cables may be laid underwater for very long distances such that the cable may traverse waters neighboring various countries or even continents. Branching units then serve for extracting (dropping) from the main transmission line one or more wavelengths and direct them to a terminal station at the end of the branch; and/or incorporating (adding) one or more wavelengths coming from the terminal station into the main transmission line. Furthermore, in order to compensate for loss in the signal power during transmission, especially over long distances, repeaters are used at suitable locations along the main transmission line or along the branch lines. These repeaters typically allow the transmission of large bandwidths (typically higher than 18 nm) which incorporate a plurality of wavelengths.

SUMMARY

In a submarine network comprising repeaters, and assuming that the repeaters are identical as regards their technical characteristics, when it is desired to branch-off one or more wavelengths from the main line (trunk) to the branch terminal station, it is not possible to simply extract the desired wavelengths and route them to the terminal station without a significant impact on the wavelength performance. This is due to the fact that the repeaters designed to have large bandwidth capacities are not optimized in gain and in output power to transmit only few wavelengths. Therefore, at each branching operation, a replica of the entire bandwidth is produced and is then branched off from the trunk to the branch and transmitted, in some cases through repeaters, towards the branch terminal station. In such cases, it is needed to somehow separate and extract—at the branch terminal station—only the desired wavelengths, i.e. the wavelengths that are to be used by the branch terminal station, form the entire bandwidth. The solution currently used in submarine networks is to replicate the whole spectrum towards the branch terminal station, and to filter the desired wavelengths at the branch terminal equipment (discarding the rest of the wavelengths which are not for the use of the customer at that particular branch terminal station). However, this solution implies that there may be a possibility for the branch customer who operates the branch terminal station to have access to the wavelengths that are not part of that customer's own traffic. This possibility may give rise to problems in optical networks in which the traffic data may be subjected to confidentiality considerations. This becomes particularly critical in cases where a submarine system equipped with branches is shared between different customers from different countries.

In such circumstances, the above solution allows a customer in one country to have access to transmission data coming from or going to another country due to the fact that each customer receives the entire bandwidth of transmission data, as described above, and may be able to access to other customers' traffic data by tuning or changing the filter at reception end in the terminal station. Therefore, this possibility of having access to other customers' wavelengths may become undesirable in view of confidentiality considerations in certain countries. According to some embodiments, there is provided an optical unit for a submarine optical network, the optical unit being configured for receiving an optical signal comprising a plurality of wavelengths at least some of said wavelengths comprising traffic data and transmitting said optical signal, the optical unit comprising a processor unit configured for scrambling data of at least one wavelength comprising traffic data of the optical signal so as to make said traffic data of said at least one wavelength undetectable for a receiver station. According to some specific embodiments, the processor unit is a coupler/splitter coupled to a predetermined length of fiber so as to introduce a delay in an optical path of a wavelength, the coupler/splitter being configured to mix different delayed frames transmitted on the same wavelength.

According to some specific embodiments, the optical unit further comprises a demultiplexer for demultiplexing wanted data from unwanted data.

According to some specific embodiments, the optical unit further comprises a multiplexer for multiplexing wanted data with scrambled data to generate a multiplexed signal and for transmitting the multiplexed signal.

According to some embodiments, there is provided a branching unit comprising such optical unit.

According to some embodiments, there is provided a repeater comprising such optical unit.

According to some embodiments, there is provided a joint box comprising such optical unit.

According to some embodiments, there is provided an equalizer comprising such optical unit.

According to some embodiments, there is provided a submarine communication network comprising such optical unit.

According to some embodiments, there is provided a method of transmitting optical signals in a submarine optical network comprising receiving by an optical unit an optical signal comprising a plurality of wavelengths at least some of said wavelengths comprising traffic data; scrambling data of at least one wavelength comprising traffic data of the optical signal so as to make said traffic data of said at least one wavelength undetectable for a receiver station.

According to some specific embodiments, scrambling comprises altering voluntarily the traffic data transmitted on a particular wavelength.

According to some specific embodiments the method further comprises:
  receiving a first optical spectrum comprising wavelengths at a first input port of a coupler/splitter,
  replicating said first optical spectrum thereby generating a replicated optical spectrum,
  outputting the replicated optical spectrum from the coupler/splitter into an input port of an optical fiber having a predetermined length so as to introduce a delay in the optical path of the wavelengths, outputting the optical spectrum having delayed wavelengths from the optical fiber into a second input of the coupler/splitter, mixing the first optical spectrum input into the coupler/splitter with the optical spectrum having delayed wavelengths thereby generating a mixed optical spectrum in the coupler/splitter, outputting the mixed optical spectrum from a second output of the coupler/splitter.

These and further features and advantages of the present invention are described in more detail in the following description as well as in the claims with the aid of the accompanying drawings.

BRIEF DESCRIPTION OF THE DRAWINGS

FIG. 1 is an exemplary schematic representation of an optical unit according to some embodiments.

DETAILED DESCRIPTION

In the exemplary scheme of FIG. 1, there is shown a submerged optical unit 1 adapted for receiving an incoming optical signal $S_i$ transmitted by a transmitter stations TX and which comprises a plurality of wavelengths as schematically shown by means of arrows A1 and A2. The wavelengths are assumed to carry traffic data. In the FIGURE, one solid arrow A1 is shown as to represent a wavelength comprising data traffic (hereinafter referred to as wanted data) which is intended to be forwarded to a receiver station RX such that the receiver station is capable of receiving the wavelength and detecting the wanted data carried by such wavelength. Although in the FIGURE, A1 is shown—in an exemplary manner—to represent one wavelength (shown by one arrow), it is to be noted that in practice more than one wavelength may be received and forwarded to the receiver station.

Furthermore, a plurality of dotted arrows A2 are shown to represent a plurality of wavelengths which are comprised in the incoming optical signal $S_i$. It is further assumed that these latter wavelengths carry traffic data which are not intended for use by the receiver RX (hereinafter referred to as unwanted data) such as for example data that is intended for use by another customer.

It is therefore desired to process said unwanted data so as to make such data undetectable for the receiver RX, while the wanted data is maintained and made available to the receiver RX and while the overall bandwidth passing through the optical unit 1 remains substantially unchanged.

The incoming $S_i$ is input into a demultiplexer 11 of the optical unit 1 at input port 11a thereof. At this stage it is assumed that the bit error rate of the overall incoming signal $S_i$ is very low or about zero (as schematically shown in the FIGURE BER=0). The demultiplexer 11, demultiplexes the received signal into a first set of signals and a second set of signals. The first set of signals comprises the plurality of wavelengths A2 that carry unwanted data and the second set of signals comprises the wavelength A1 carrying wanted data. Those skilled in the related art will realize that the demultiplexer 11 may be initially designed so as to be able to perform the separation of the first set of data from the second set of data, for example according to specific wavelength values.

The wavelengths, carrying unwanted data are then processed in a processor unit adapted to scramble the unwanted data in the received wavelengths such that the unwanted data of these wavelengths become undetectable for the receiver. Scrambling is a known technique for mixing data and in general terms comprises altering voluntarily the optical spectrum transmitted on a particular wavelength, in such application in order to prevent the receiver from using this traffic.

The fact that the data is scrambled in a signal to make it undetectable for the receiver, in the context of the present invention, may be directly and positively verified by tests or other procedures known to a person skilled in the related art without undo experimentation.

Referring back to FIG. 1, one non-limiting example of scrambling by altering the traffic data transmitted on a particular wavelength is described where use is made of a coupler/splitter 12 coupled to a length of optical fiber 13 as a processor unit.

The wavelengths A2 carrying unwanted data are output from the output port 11b of the demultiplexer 11 and are input into a first input port 12a of the coupler/splitter 12. The wavelengths A2 form an optical spectrum. Inside the coupler/splitter 12 the input optical spectrum is replicated thereby generating another optical spectrum which is replicate of the input optical spectrum. The replication typically involves separation of the wavelengths as regards their power. In one exemplary embodiment the separation may be made at half power (as compared to the received power), however this is not mandatory and other ratios of separation may also be used.

A first group of the separated wavelengths (a first optical spectrum) is then input through a first output port 12d of the coupler/splitter into an optical fiber 13. This group of wavelengths travels along the length of the optical fiber 13, where it undergoes certain delay, and is reinserted into the coupler/splitter at the second input port 12b thereof and is mixed with the incoming wavelengths that are being input through the first input 12a. The length of the fiber may be determined as a function of the amount of delay required for a specific application.

After mixing the wavelengths in the coupler/splitter 12, the process of replicating the optical spectrum and thereby separating the wavelengths and looping back a part of it through fiber 13 to the second input 12b is repeated in a similar manner as described above. The part of the separated wavelengths which is not forwarded to the optical fiber 13 is output at the second output 12c. In this manner the data output from the output port 12c, which is the data to be combined with the wanted data is made undetectable at the receiver side.

In fact the transformation may be made in such a manner that the bit error rate of resulting data is as high as possible, or ideally about 1 (as schematically shown in the FIGURE BER=1). In this manner, the synchronization signal transmitted in the data to be used as a reference to sample the received signal is lost in reception thereby making the unwanted data undetectable by any receiver.

As a consequence, although the receiver RX receives wavelengths A2 representing the same power levels as would have been the case when the (non-scrambled) unwanted data were received by the receiver, due to the scrambling performed on the traffic data in the wavelengths A2, the data originally carried by the wavelengths A2 are not detectable by the receiver RX.

Referring back to FIG. 1, the wavelengths A2 with scrambled data are then output from the coupler/splitter 12, and input into an input port 14b of a multiplexer 14.

The demultiplexer 11 further outputs through output port 11c the wavelength A1 carrying wanted data as shown in the FIGURE. This data is forwarded without any substantial change towards the multiplexer 14 where it is input in the latter through input port 14c. At this stage the bit error rate of this wavelength A1 is very low or about zero (as schematically shown in the FIGURE BER=0).

The multiplexer 14, multiplexes the wavelengths A2 carrying scrambled data input at its input port 14b with the wavelength A1 carrying wanted data input at its input port 14c and outputs the resulting multiplexed signal $S_o$ through its output port 14a towards the receiver RX.

As mentioned above, other methods of scrambling may also be used. One of such examples is to combine the wavelengths carrying unwanted data with wavelengths having identical characteristics (frequency range, power) but carrying other traffic data (for example data corresponding to a different traffic). This process may be performed by extracting wavelengths coming from another source (e.g. another end station in the submarine network) to combine them with the unwanted data to be scrambled The optical unit 1 may be incorporated inside an optical submerged (e.g. submarine) unit such as for example a branching unit, a repeater, an equalizer, a joint box or any other optical branch submerged equipment.

It is to be noted that the list of structures corresponding to the claimed means is not exhaustive and that one skilled in the art understands that equivalent structures can be substituted for the recited structure without departing from the scope of the invention.

The invention claimed is:

1. An optical unit for a submarine optical network, the optical unit being configured to receive an optical signal comprising a plurality of wavelengths, at least some of said plurality of wavelengths comprising traffic data, and to transmit said optical signal, the optical unit comprising:
    a demultiplexer for receiving the optical signal and separating it into a wanted signal of one or more wavelengths and an unwanted signal of one or more wavelengths;
    a processor unit configured to receive the unwanted signal and scramble data of at least one wavelength of the unwanted signal to generate a scrambled signal undetectable for any receiver station; and
    a multiplexer configured to multiplex said scrambled signal with said wanted signal to transmit a multiplexed signal.

2. The optical unit of claim 1 wherein said processor unit is a coupler/splitter coupled to a predetermined length of fiber to introduce a delay in an optical path of a wavelength, the coupler/splitter being configured to mix different delayed frames transmitted on the same wavelength.

3. The optical unit of claim 1 wherein the optical unit is incorporated inside a branching unit.

4. The optical unit of claim 1 wherein the optical unit is incorporated inside a repeater.

5. The optical unit of claim 1 wherein the optical unit is incorporated inside an equalizer.

6. The optical unit of claim 1 wherein the optical unit is incorporated inside a joint box.

7. The optical unit of claim 1 wherein the optical unit is incorporated inside a submarine communication network.

8. A method of transmitting optical signals in a submarine optical network comprising the steps of:
    receiving, by an optical unit, an optical signal comprising a plurality of wavelengths at least some of said wavelengths comprising wanted data;
    demultiplexing the received optical signal into a wanted signal of one or more wavelengths, and an unwanted signal of one or more wavelengths;
    scrambling the unwanted signal by scrambling data of at least one wavelength of the unwanted signal to generate a scrambled signal undetectable for any receiver station; and
    multiplexing via a multiplexer said scrambled unwanted signal with said wanted signal and transmitting a multiplexed signal.

9. The method of claim 8 wherein the scrambling step further comprises the step of altering voluntarily the traffic data transmitted on a particular wavelength.

10. The method of claim 8 wherein the scrambling step further comprising the steps of:
    receiving a first optical spectrum comprising wavelengths at a first input port of a coupler/splitter,
    replicating said first optical spectrum to generate a replicated optical spectrum,
    outputting the replicated optical spectrum from the coupler/splitter into an input port of an optical fiber having a predetermined length to introduce a delay in the optical path of the wavelengths,
    outputting the optical spectrum having delayed wavelengths from the optical fiber into a second input of the coupler/splitter,
    mixing the first optical spectrum input into the coupler/splitter with the optical spectrum having delayed wavelengths thereby generating a mixed optical spectrum in the coupler/splitter, and
    outputting the mixed optical spectrum from a second output of the coupler/splitter.

* * * * *